United States Patent [19]
Cavender

[11] Patent Number: 4,946,363
[45] Date of Patent: Aug. 7, 1990

[54] MOLD AND MOLD VENT

[75] Inventor: Keith D. Cavender, Charleston, W. Va.

[73] Assignee: Union Carbide Chemicals and Plastics Company Inc., Danbury, Conn.

[21] Appl. No.: 221,758

[22] Filed: Jul. 20, 1988

[51] Int. Cl.$^5$ .......................................... B29C 67/22
[52] U.S. Cl. ................................. 425/4 R; 249/141; 425/84; 425/812; 425/817 R
[58] Field of Search ............... 425/4 R, 4 C, 84, 85, 425/420, 812, 817 R, 817 C; 249/141; 264/50–52

[56] References Cited

U.S. PATENT DOCUMENTS

| | | | |
|---|---|---|---|
| 3,160,928 | 12/1964 | Smillie | 425/812 X |
| 3,230,590 | 1/1966 | Schaible et al. | 425/812 X |
| 3,572,421 | 3/1971 | Mezey et al. | 249/141 X |
| 3,771,928 | 11/1973 | Gostyn et al. | 425/4 R |
| 3,844,523 | 10/1974 | Wilheim | 425/85 X |
| 3,871,060 | 3/1975 | Ladney, Jr. | 264/41 X |
| 3,880,557 | 4/1975 | Nelson | 425/547 X |
| 3,889,919 | 6/1975 | Ladney, Jr. | 249/141 |
| 4,026,512 | 5/1977 | Holt | 249/141 |
| 4,333,899 | 6/1982 | Hogan et al. | 264/51 |
| 4,354,656 | 10/1982 | Kain | 249/78 |
| 4,555,087 | 11/1985 | Wallner et al. | 425/4 R X |
| 4,721,279 | 1/1988 | Oleszko et al. | 425/817 R X |

FOREIGN PATENT DOCUMENTS

| | | | |
|---|---|---|---|
| 1704566 | 5/1971 | Fed. Rep. of Germany . | |
| 2246948 | 4/1974 | Fed. Rep. of Germany | 425/812 |
| 2503021 | 7/1976 | Fed. Rep. of Germany | 249/141 |
| 223397 | 6/1985 | German Democratic Rep. | 425/812 |
| 55-017511 | 2/1980 | Japan . | |
| 59-048131 | 3/1984 | Japan . | |
| 2050931 | 1/1981 | United Kingdom | 425/85 |

Primary Examiner—Richard L. Chiesa
Attorney, Agent, or Firm—Bonnie L. Deppenbrock

[57] ABSTRACT

Vents for molds can be improved if, in place of a single relatively large vent opening, there is used a vent which has a plurality of relatively smaller vent openings in which the cumulative cross-sectional area of the relatively smaller vent openings are approximately the same as that of the relatively larger vent opening it replaces. It was also found that the vents have a more efficient self-cleaning capability if the ratio of the depth of each vent opening to the cross-sectional diameter of the vent opening is about 1 or less.

5 Claims, 1 Drawing Sheet

MOLD AND MOLD VENT

BACKGROUND OF THE INVENTION

1. Field of the Invention

This invention relates to a mold for use in molding foaming mixture and the means to vent this mold as the foaming mixture fills the mold. More specifically, this invention relates to enhanced foam containment vents for a mold and a structure for such vents which rapidly obturate, significantly reduce the loss of material through the vent, are self-cleaning, and significantly reduce the amount of collapse of the foaming material in the region of the vent.

2. Description of the Prior Art

In the manufacture of molded foamed products, such as high resilience (HR) polyurethane foam products, for example, in automotive seating and other products, it is common practice to utilize molds which have air vents, e.g., molds with vented lids. The venting provides for the displacement of air out of the mold as the foaming mass expands to fill the various intricacies of the mold. This venting is necessary in order to preclude air entrapment in the molded product and also to prevent the incomplete filling of the mold by the expanding foam thereby resulting in a defective part. Consequently, it is necessary to have some form of venting as a part of the mold. It is general practice to locate vents in a mold in a manner such that as the foam mass expands the foaming polymer can readily push the air towards the vents and thus expand to the vent areas. In actual practice the expanding foam will expand to the area of the vent and will then in most cases expand into and through the vent forming a small bun of material on the vent surface on the exterior of the mold. In this way the molder is assured that the mold has been filled with the expanding foam. However, all of the foam that exudes through one or more of the vents is essentially wasted material. In the ideal situation the foam would completely fill the intricacies of the mold and expand to the area of each of the vents, but would not expand into and through the vent.

There is additionally the problem that when the foam expands into the vents that the vents will become clogged. In that instance prior to the mold being reused in another cycle to produce a product the vents must be cleaned in order to assure that they will work properly in the next molding cycle. This cleaning of the mold vents requires additional personnel for the molding operation and further increases the cycle time for producing the molded products.

In practice in a polyurethane foam system, as the expanding urethane reaches the vents there are still residual expanding forces existent resulting from the water-isocyanate blowing reaction which cause a portion of the still reacting (i.e., polymerizing) urethane mass to extrude through the vent holes forming a "bun" or "mushroom" of foam on the back of the mold lid. These vent exudates represent lost material and in some applications can represent material losses of 5-7%. In addition, as final mold fill out occurs in the latter stages of the ongoing urethane polymer growth reaction the foaming mass at the time of exudation is approaching the gelatin stage where mobility is lost. Further movement of the expanded mass as would result from blowing reaction forces causing or forcing the near gelled polyurethane to flow towards and through the vents result in collapse of foam in the areas adjacent the vents. Typical vents range in size from ~1/16" up to ~¼" in diameter and if plugged with urethane from a previous molding and not properly cleaned will be the source of a defect (air entrapment) in the next molding. Typical HR mold venting therefore has three disadvantages: (1) material loss as vent exudate, (2) foam collapse due to late movement, and (3) a need for regular cleaning and visual inspection prior to each molding.

The ideal mold venting mechanism would allow for total air displacement from the mold and at the instant of final mold fill-out the vent would be closed or sealed thereby precluding all exudation. In the normal mold venting technique currently employed in the polyurethane foam molding industry, vent obturation occurs only when the urethane system passes through and cures within the vent so as to form an in situ plug thereby preventing further foam compound exudation. In most cases this occurs only after significant material has already escaped through the vent.

It is a commonly employed technique to use vent diameter as a variable to control flow of the expanding urethane foam within a mold. A larger diameter vent will allow a greater air volume to pass through at a given pressure differential than will a smaller vent, therefore in-mold froth flow will be biased towards a larger vent. In addition a smaller vent will not only be more restrictive to air flow but will obturate with foam more quickly once foam reaches it and will exhibit less exudate. The greater exudate through a larger diameter vent and its later obturation will also be more likely to exhibit foam instability or collapse in the areas adjacent to the vent. This instability or collapse tendency is a function of the higher shear regimen (greater mass flow) and the fact that the foam is being forced to move in the later polymer growth reaction stages where fluidity or effective system mobility is being rapidly lost.

A great deal of effort has been expended in trying to resolve these problems. A known technique in the industry to limit foam extrusion through air bleed vents is to utilize vents covered with porous tape or in some cases fabric. The paper tape or the fabric will allow air to pass through but will quickly plug when the urethane reaches the porous element. While this system works well, it requires that each vent be manually served before each molding. Some molds may have 25 or more vents making this technique impractical except for certain specialized applications.

The driving force for urethane foam exudation through open vents is the differential pressure across the vent resulting from the $CO_2$ generated by the reaction of the isocyanate and water and may be augmented by an auxiliary blowing agent such as a fluorocarbon. Exudation ceases only when either the vent becomes effectively sealed or the pressure internal to the mold is effectively vented, i.e., equilibrated with atmospheric pressure. It appears feasible that pressure equilibration could be utilized as a means of limiting exudation if at the proper time, i.e., time of complete mold fill out, the pressure external to the mold vent could be balanced with that internal to the mold. One technique of achieving this is to have variable volume chambers on the normally atmospheric side of each vent. Into these chambers air displaced from the mold by the expanding urethane is collected and the pressure continues to rise until it becomes equilibrated with that internal to the mold. Adjustment of the volume of such chambers would allow this equilibration to coincide with complete mold fill out thereby effectively precluding any exudation. A system utilizing a concept similar to this is disclosed in Japanese Patent Publication 83/143716.

The negative factors associated with this technique are an expected inability to handle day to day changes in line parameters which can effectively change the normal in-mold pressures. Examples of such causatives are mold temperatures, reactant stream temperature, fill weight variances, mold leakage, mixing efficiency and compound raw material variations that may effect reactivity (specifically small changes in formulation water). In addition, this technique would appear to be practically limited to simple molds requiring a small number of vents.

In Japanese Patent Publication 83/148458 there is disclosed the use of a vent which has vent holes in the form of slits. This contrasts with the usual vent hole which is circular in shape. The objective in the use of a slit form for a vent hole is to provide for a firm fitting in the opening that carries the vent and to maintain a good and secure fit during the thermal expansion and contraction of the mold.

Japanese Patent Publication 83/143716 (Kokai, Sho 55-17511/80) discloses a box-shaped air storage chamber that is provided on the top of a vertical mold and which enables the molding of foams without clogging the fine gas vent holes. This reference reports that the use of this air storage chamber precludes any significant clogging of the fine gas vent holes with the foam.

In contrast, U.S. Pat. No. 4,555,087 discloses a method of preventing the clogging of the vent openings by means of heating the vent openings. The objective in this patent is to provide sufficient heat at the area of the vent opening so that the foam will rapidly set in this area and not expand into the vent and thus clog the vent.

French Patent Application No. 2513933 discloses a method for making porous mold tools. These tools are made from casting resins which have arrayed therethrough a number of pins or rods. After the resin has been solidified the pins or rods are removed thereby providing a number of vents that will be used when the mold tool is utilized for the production of particular products. The resulting vents are long and are difficult to clean when they become clogged.

The problem of foam extruding into and through the air vent openings of a mold was also addressed in German Pat. No. 1704566. It is noted in this patent that a considerable amount of product can be lost due to foam exuding through vent openings This patent suggests the use of a sieve or similar covering on the vent openings to prevent loss of foam and discloses that the sieve can be made of tissue or of a perforated plate having openings of about 0.5 to 1 mm. This patent also notes that any foam residues which adhere to the sieves can be removed easily by brushing or some similar method. The German patent states that the vent openings in the wall of the mold should not be less than 3 millimeters in diameter and they can be of a larger size such as 10 millimeters in diameter or greater. The problem with regard to the technique of the German patent is that there is a disproportionate decrease in the cross-sectional area of the vent opening, i.e., the size of the effective opening (through which gas can flow) of the smaller vent openings is reduced to a greater extent than that of the larger vent openings, resulting in disruption of the direction and rate of flow of foaming material in the mold which can result in too much material flowing to the larger vent openings and not enough flowing to the smaller vent openings, leaving voids in the vicinity of the smaller vent openings.

German Pat. No. 3026238 discloses a technique for preventing a molding composition from exuding through vent openings by covering over the vent openings with a very thin flexible foil. The flexible foil permits some or most of the air to escape through the vents but precludes the passage of the expanding elastomer through the air vents.

In contrast, in U.S. Pat. No. 3,880,557 there is disclosed a technique of capping off the air vents as the molded material displaces air along the length of a cavity. By the use of more intricate controls the various air vents can be closed when the material being molded passes into the region of an air vent. This provides a fairly complex technique in trying to resolve the above-mentioned problems.

Another technique that has been used is shown in U.S. Pat. No. 3,844,523 which discloses the utilization of a breathable release sheet to vent the air from a mold as a product is being molded. In this way the air in the mold is released over a larger area.

Japanese Patent Publication No. 77/1654 attempts to control the escape of air through vents of a mold by using weighted covers to avoid overflow of expanding material from the mold. Japanese Patent Publication 78/35532 discloses the use of glass wool to cover mold vents.

There are yet other techniques that have been attempted with regard to solving the above-mentioned problems. In prior attempts to be assured that all of the intricacies of the mold are filled with the foaming product, no convenient techniques have been brought forward where the foaming material will not expand into the vents, and further will provide for a more uniform product throughout especially in the region of the vents. The objective of filling all of the intricacies of a mold appears to be directly at odds with the objective of trying to keep the foaming mixture from exuding into and through the vent holes.

SUMMARY OF THE INVENTION

The present invention is based on a unique construction of air vents that are utilized on molding equipment. This unique construction minimizes or prevents the flow of an expanding foam mass out through the novel air vents. The foamed product in the region of the air vents of this invention is of a more uniform structure in contrast to the structure of foams heretofore produced where a considerable amount of the foaming material exudes through the air vent resulting in a collapsed area in the region of the vent holes. When the air vents of this invention are used there is a reduction in the shear induced foam collapse that often occurred heretofore in the region adjacent the air vent.

The new air vent of this invention has the same total cross-sectional area vent opening as the heretofore known vent that it replaces. However, the novel vent is constructed such that in place of one large vent opening there are a plurality of at least four clustered, smaller vent openings. It is important that the total cumulative cross-sectional area of the smaller vent openings are approximately equivalent to the cross-sectional area of the single air vent opening replaced by it. The reason for this is to provide the desired direction and rate of flow of the foaming mass in the mold because the in-mold flow of foaming mass or froth is biased towards the larger vent openings. In order to effectuate the removal of air from the mold at essentially the same rate the cumulative cross-sectional area of the multiple smaller openings of the new air vents must be equal or approximately equal to that of the single opening air vent.

In use, when the foaming material approaches into the region of the novel air vent, the smaller openings in the novel vent rapidly obturate to prevent the flow of significant amounts of foaming material through the novel vent openings. This has the secondary effect of providing a more uniform foamed material throughout the product, particularly in the region of each of the novel air vents.

The cross-sectional diameter of the smaller openings of the novel vent preferably are not greater than about 1/16 inch (1.56 mm); however, they can be of a smaller size. In addition, the openings of any particular vent of this invention do not have to be of a uniform shape or size but can vary in shape or size for a given novel vent. Furthermore, it has been found that the vent of this invention is self-cleaning to a greater extent, when the ratio of the depth of the opening to the diameter of the opening is about one or less. That is, the thickness of the portion of the vent that carries the plurality of vent openings should be equivalent to or less than the diameter of the openings. Unexpectedly, it was found that, when this was the case, the small vent openings do not become easily clogged. Furthermore, any foam material adhering in, or in the region of, the novel vent openings is easily removed.

BRIEF DESCRIPTION OF INVENTION

DETAILED DESCRIPTION OF THE INVENTION

The present invention is directed to improvements in mold vents that are utilized in molds used to mold various foamable products. When a foamable product is being produced, a mixture of the ingredients that are to be expanded to form the foamed product are placed into a mold having an internal cavity which defines the exterior shape of the desired molded product. The mold is then closed. The foaming reaction begins when the mixture of ingredients is formed and continues after the mold is closed. As the foaming mixture expands to fill the mold cavity it must force out the air that is within the cavity. If this air is not removed from the mold the mold is not completely filled with foaming mixture and the end foamed product would have a considerable number of voids. The technique that is used to remove this air consists of one or more air vents. Generally a plurality of air vents are utilized so as to direct the movement of the foaming mixture within the mold and thereby fill the entire mold cavity. However, it is the objective that although the mold cavity must be fully filled with the foaming mixture, the foaming mixture should not exude to any great extent out of the mold cavity through one or more of the air vent openings. This is what occurs with the use of many of the heretofore known air vents with the consequent loss of substantial amounts of material.

Figure 1:
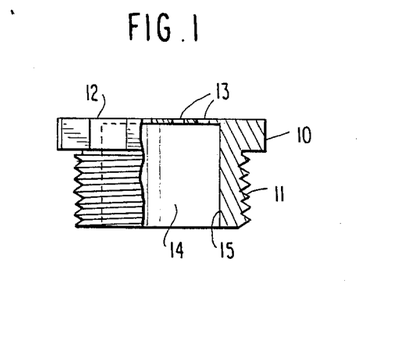
FIG. 1 is a side elevational view in section showing a vent of this invention having a cylindrical bore through which air is vented.
Figure 2:
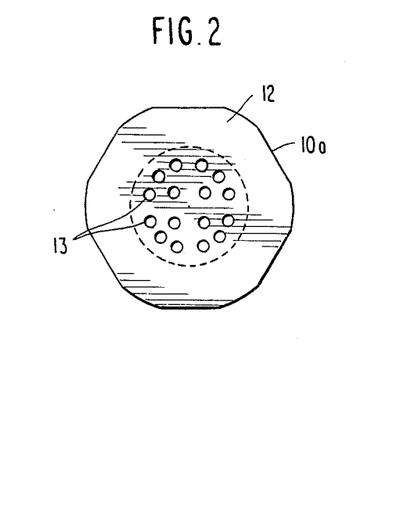
FIG. 2 is a top plan view of the vent of FIG. 1.
Figure 3:
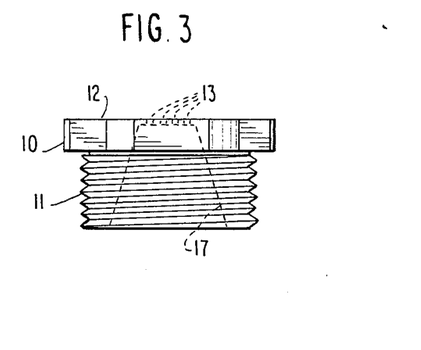
FIG. 3 is a side elevational view in section showing a vent of this invention similar to that shown in FIGS. 1 and 2 but having a truncated conical bore through which air is vented.

FIGS. 1 and 2 show one embodiment of the mold vents of this invention. The vent shown is essentially a threaded plug with a central inner chamber terminating in an upper wall having a plurality of openings. This threaded plug consists of upper portion 10 which has a number of sides 10a (FIG. 2) adapted to be gripped by means of a tool. The air vent is secured to the mold by means of the threads 11 adapted to be screwed into suitably sized threaded holes provided in the mold in which the vent is to be used. The upper surface of the air vent consists of an upper wall 12 which carries a cluster of a plurality of apertures or openings 13. The vent is formed with a cylindrical bore 14 having walls 15. The bore 14 does not have to be cylindrical but can be any desired shape, e.g., truncated conical shaped as shown in FIG. 3. The bore 14 connects the openings 13 with the interior of the mold in which the vent is used. It is important with regard to the vent shown in FIG. 1 that the cumulative cross-sectional area of the clustered plurality of openings 13 is of a size sufficient to provide the desired direction and flow of foaming mixture in the mold in which it is used. In those instances where the novel vent is to replace a single opening vent heretofore used in the mold, the cumulative cross-sectional area of the cluster of openings 13 should be equivalent, or approximately equivalent, to the cross-sectional area of the heretofore known single opening. The objective is to have the same amount of aperture area so that the air within the mold can escape from the mold at the same preselected rate whether the air vent has a large single opening or a plurality of smaller openings.

The openings 13 can be about 1/16 inch (1.56 mm) in diameter or less. The use of larger apertures is not as effective and can require more frequent cleaning; however, the use of smaller apertures, e.g., 1/64 inch (0.39 mm) or less, has been found to be effective. Furthermore, as noted above, the apertures 13 can vary in size or shape with regard to any one particular novel vent. The apertures need not be of a uniform size or shape in any one cluster.

FIG. 3 shows an embodiment of the vent wherein its bore 17 is of a truncated conical shape rather than being of a cylindrical shape. In this embodiment 13 represents the openings in the top surface of the air vent. The truncated conical region within the air vent has sidewall 17. As with the vent of FIGS. 1 and 2 the vent of FIG. 3 is suitably threadedly engaged into a threaded hole in the mold.

Figure 4:
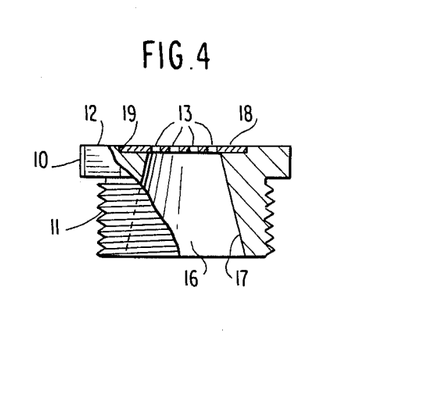
FIG. 4 is a side elevational view in section of a novel vent having a ratio of the depth of the multiple openings to the diameter of the openings of about one or less.
Figure 5:
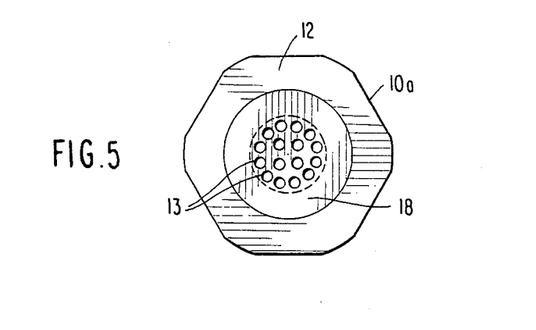
FIG. 5 is a top plan view of the vent shown in FIG. 4 showing multiple vent openings of varying size.

In FIGS. 4 and 5, there is shown a further embodiment of the novel vent. In addition to the finding that the use of a plurality of smaller openings having a cross-sectional area approximately equivalent to that of a single larger opening provides several advantages in the molding of foaming mixtures, it was also found that when the ratio of the depth of the openings of the vent of the present invention to the diameter of the openings is about one or less, the self-cleaning feature of the novel vent is made more efficient. That is, it was found that the depth of each opening 13 should be equivalent to or less than its cross-sectional diameter. When the vent is of this type of a structure it has been found that the air vent is more efficient in self-cleaning. It appears that any foaming material which enters openings having these dimensions will not remain in the openings to clog them when the mold is opened. Any material entering the opening remains with the foamed product. In FIG. 4, the interior bore 16 of the novel vent is shown to be of a truncated conical shape. However, this bore area can be of a cylindrical shape or of essentially any other shape. Sidewall 17 of the truncated conical bore 16 defines the bore.

The new vent of this invention can be a single piece construction as shown in FIGS. 1, 2 and 3, or of a multi-piece construction as shown in FIGS. 4 and 5. If in the form of a single piece construction, the vent will have a pre-determined number of openings 13 of a pre-determined diameter drilled through upper wall 12 of the vent communicating the exterior surface of the vent with the inner bore of the air vent. The interior bore 14, 16 of the novel vent can be of any desired shape. However, it is possible to have the vents constructed so that they will have interchangeable openings portions, i.e., piece 18 in which are formed openings 13. In such an instance, the piece 18 that carries the openings 13 is inserted into a recess 19 formed in top wall 12 of the air vent and secured by a suitable securing means, e.g., by press-fitting, adhesive, soldering, welding, etc.

The present air vents can be utilized with any mold that is used to mold products using a foaming technique. Although one of the most common foams that is utilized is a polyurethane foam, the present air vents can be utilized when foaming various other polymeric materials. Various other polymeric materials that can be formed into products by foaming and which can be produced in molds using the present air vents include polystyrene, poly(vinyl chlorides), polyolefins, foamed rubber, etc.

The present invention is especially suited to the manufacture of polyurethane foamed products. The resulting polyurethane foams can be rigid foams or non-rigid foams. The foamable reaction mixture is conveniently prepared by mixing a preblend of all ingredients except the polyisocyanate and the blowing agent. The polyisocyanate and the blowing agent are then quickly mixed into the preblend and the resulting mixture quickly introduced into the mold. The mold is then closed and maintained at the temperature. The preblend contains ingredients, such as, the polyol which may comprise a polymer/polyol or a mixture of polyol and polymer/polyol; water; catalyst or catalysts; surfactant or surfactants; and in addition any other ingredients such as pigments or special effects additives. Since none of these ingredients in the preblend inter-react with each other the preblend may be formed well in advance of mixing the polyisocyanate and fluorocarbon blowing agent. However, once the polyol and/or water are contacted with the polyisocyanate the polyurethane-forming or $CO_2$ forming reaction begins. The blowing agents that are utilized, such as fluorocarbons, are quite volatile and it is preferred to add the blowing agent to the preblend just prior to when it is to be used.

Substantially any polyol used in the art to make polyurethanes can be used in making the foamable reaction mixtures. Illustrative polyols useful in producing foamable composition used in this invention are the polyhydroxyalkanes, the polyoxyalklene polyols, or the like. Among the polyols which can be employed are those selected from one or more of the following classes of compositions, alone or in a mixture, known to those skilled in the polyurethane art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from naturals oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the propylene oxide adducts and the propylene oxide-ethylene oxide adducts of di- and/or trihydroxyalkanes.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are for example, bisphenol A, bisphenol F, condensation products of phenol and formaldehyde, the novolac resins; condensation products of various phenolic compounds and acrolein; the simplest member of this class being the 1,1,3-tri(hydroxyphenyl) propanes, condensation products of various phenolic compounds and glyoxal, glutaraldehyde, and other dialdehydes, the simplest members of this class being the 1,1,2,2-tetrakis(hydroxyphenol) ethanes, and the like.

The polyols employed can have hydroxyl numbers which vary over a wide range and are suitable to provide flexible or semi-flexible polyurethane foams from reaction with polyisocyanate. In general, the hydroxyl numbers of the polyols employed can range from about 20, and lower, to about 150, and higher. The hydroxyl number is defined as the number of milligrams of potassium hydroxide required for the complete hydrolysis of the fully acetylated or phthalated derivative prepared from 1 gram of polyols. The hydroxyl number also is defined by multiplying 56.1 times 1000 time functionality (i.e., the average number of hydroxyl groups per molecule of polyol) and dividing the product by the molecular weight of the product. The exact polyol employed depends upon the end-use of the polyurethane product to be produced. The molecular weight or the hydroxyl number is selected properly to result in flexible or semi-flexible or rigid foams when the polyol is converted to a polyurethane. The polyols preferably possess a hydroxyl number of from about 50 to about 150 for semi-flexible foams, over 150 for rigid foams, and from about 30 to about 70 for flexible foams but can be as low as 20. Such limits are not intended to be restrictive, but are merely illustrative of the large number of possible combinations of the above polyol coreactants.

The most preferred polyols employed in this invention include the poly(oxypropylene) glycols, triols and higher functionality polyols. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. Most preferably, the ethylene oxide when used is incorporated as terminal blocks, i.e., capping units. Polymer/polyols can be used and are preferred as a part or all of the polyol requirements of the foamable formulation used in this invention and are also well known, the basic patents being U.S. Pat. Nos. 3,304,273; 3,383,351, Re. 28,715 (reissue of 3,383,351) and 3,523,093. Other disclosures of polymer/polyols include the Scharf et al. and Kuryla Canadian Pat. Nos. 735,010 and 785,835; the Pizzini et al. U.S. Pat. No. 3,823,201; the Ramlow et al. U.S. Patent Application, Ser. No. 431,080, filed Jan. 7, 1974; the Ramlow et al. patent U.S. Pat. No. 3,953,393; the DeWald U.S. Pat. No. 3,655,553; the Shah patent U.S. Pat. No. 4,119,586; the PHD polyols of U.S. Pat. No. 3,325,421; and the PIPA polyols of U.S. Pat. No. 4,374,209. These as well as any other suitable polymer/polyol can be employed herein. The polymer of the polymer/polyol is formed by polymerizing one or more polymerizable ethylenically unsaturated monomers. The proportion of polymer in the polymer/polyol can range from about 4 to about 50 weight percent, preferably from about 15 to about 35 weight percent, based on the total weight of the polymer/polyol. The polymer is preferably formed in situ with the polyol which can be any of the polyols described above. The polymerizable ethylenically unsaturated monmoners which can be used making the polymer/polyols employed in this invention include the polymerizable ethylenically unsaturated hydrocarbon monomers and polymerizable ethylenically unsaturated organic monomers the molecules of which are composed of carbon, hydrogen and at least one of O, S, or N. These monomers are characterized by the presence therein of at least one polymerizable ethylenic unsaturated group of the type >C=C<. the monomers can be used singly or in combination to produce homopolymer/polyol or copolymer/polyol reactive compositions. These monomers are well-known in the art and include the hydrocarbon monomers such as styrene, alpha-methylstyrene, para-methylstyrene, 2,4-dimethylstyrene, ethylstyrene, isopropylstyrene, butylstyrene, phenylstyrene, cyclohexylstyrene, benzylstyrene, and the like; the acrylic and substituted acrylic monomers such as acrylic acid, methacrylic acid, methyl acrylate, 2-hydroxyethyl acrylate, 2-hydroxyethyl methacrylate, methyl methacrylate, octyl methacrylate, acrylonitrile, methacrylonitrile, 2-ethylhexyl acrylate, phenyl acrylate, phenyl methacrylate, N,N-dimethylacrylamide, and the like; the vinyl esters, vinyl alcohol, and vinyl ketones, etc., such as, vinyl acetate, vinyl alcohol, vinyl butyrate, vinyl acrylate, vinyl methacrylate, N-vinyl-pyrrolidone, and the like; the vinyl halides and vinylidene halides, such as, vinyl chloride, vinyl fluoride and vinylidene chloride and the like; t-butylaminoethyl methacrylate, glycidyl acrylate, allyl alcohol, vinyl pyridine, and the like. Any of the known polymerizable monomers can be used and the compounds listed above are illustrative and not restrictive of the monomers suitable for use in this invention. Any of the known chain transfer agents can be present if desired. The preferred monomer used to make the polymer of the polymer/polyol used in this invention is acrylonitrile alone is a homopolymer or in combination with styrene or methyl methacrylate as a copolymer. The relative weight proportions of acrylonitrile to styrene illustratively range from about 20:80 to about 100:0, preferably from about 25:75 to 100:0 and more preferably, when low molecular weight polyols, e.g., below about 2000 are used, then the weight ratio should be from about 60:40 to about 85:15.

The catalysts that are useful in producing molded cellular flexible polyurethane in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylenediamine, triethylanolamine, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetyl-acetoneimine, bis-acetylacetone-alklenediimines, salicylaldehydeimine, and the like, with the various metals such as Be, Mg, Zn, Cd, Pb, Ti, Zr, Sn, As; Bi, Cr, Mo, Mn, Fe, Co, Ni, or such ions as $MoO_2^{++}$, $UO_2^{++}$, and the like (f) alcoholates and phenolates of various metals such as $Ti(OR)_4$, $Sn(OR)_4$, $SN(OR)_2$, $Al(OR)_3$, and the like, wherein R is alkyl or aryl and the reaction products of alcoholates with carboxylic acids, beta-diketones, and. 2-(N-N-dialkylamino) alkanols, such as the well-known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and lead naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutylin-bis(6- methylaminocaproate), and the like. Similarly, there may be used a trialkyltin hydroxide, dialkytin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide), dibutyltin-bis(2-dimethylaminopentylate), dibutyltin dichloride, dioctyline dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example from about 0.001 percent to about 5 percent of each, based on weight of the reaction mixture.

It is also within the scope of the invention to employ small amounts, e.g., about 0.01 percent to 5.0 percent by weight, based on the total reaction mixture, of a silicone foam stabilizer. Useful silicone surfactants included blends of one or more polyols as defined hereinabove with a silicone such as an aryl modified dimethyl silicone oil or a polyphenylethyl siloxane copolymer. Other useful silicone surfactants are the "hydrolyzable" polysiloxanepolyoxyalkylene block copolymers such as the block copolymers described in U.S. Pat. Nos. 2,834,748 and 2,917,480. Another useful class of foam stabilizers are the "nonhydrolyzable" polysiloxane-polyoxyalkylene block copolymers such as the block copolymers described in U.S. Pat. No. 3,505,377; U.S. Patent Application No. 888,067, filed Dec. 24, 1969, and British Patent Specification No. 1,220,471. The latter class of copolymers differs from the above-mentioned polysiloxanepoloxyalkene block copolymers in that the polysiloxane moiety is bonded to polyoxyalkylene moiety through carbon-to-oxygen-to-silicon bonds. These various polysiloxanepolyoxyalkylene block copolymers preferably contain from 5 to 50 weight percent of polysiloxane polymer with the remainder being polyoxyalkylene polymer. Any other suitable surfactants or stabilizers can be used.

Any compatible pigment can be used in the foamable mixture used in this invention. Carbon black is extensively used as a pigment in polyurethane products. Other useful pigments include Prussian blue, manganese violet, manganese blue, emerald green, cobalt blue, cobalt violet, Mayan blue, iron oxide red, chrome red, vermillion, ultramarine blue, ultramarine violet, phthalocyanine green and brilliant red. The amounts of pigments used are not narrowly critical and depend in large part on the shade of medium to dark color desired. Illustrative ranges are from about 0.1 to about 4 weight percent, preferably about 0.3 to about 2 weight percent of the pigment based on the weight of the polyurethane product. Larger amounts of pigment can be used although difficulties with mixing and handling the larger amounts of pigments can result because of increased viscosity. The pigment can be incorporated into the polyol, the polyisocyanate composition, or both but preferably is added to the preblend.

A small amount of a polyurethane blowing agent, such as, water, is used in the foamable reaction mixture (for example, from about 0.1 to about 5 weight percent of water or more, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexaflurocyclobutane, octafluorocyclobutane, and the like. Another class of blowing agents include thermally unstable compounds which liberate gases upon heating, such as N,N'-dimethyl-N,N'-dinitrosoterephthalamide, and the like. The quantity of blowing agent employed will vary with factors, such as, the density desired in the foamed product.

The organic polyisocyanates that are useful in producing the novel molded flexible polyurethane cellular products in accordance with this invention are organic compounds that contain at least two isocyanate groups and include the monomeric and polymeric organic polyisocyanates such as prepolymers produced by reacting a polyol with an excess of a polyisocyanate. The quasi-prepolymers such as the reaction products of excess tolylene diisocyanate and short chain polyoxypropylene diols or triols, are preferred in those instances where ease of processing such materials is desired. The polyisocyanates are well-known in the art. Suitable organic polyisocyanates include the hydrocarbon diisocyanates (e.g., the alkylene diisocyanates and the arylene diisocyanates) as well as triisocyanates. As examples of suitable polyisocyanates one can mention, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis-(isocyanatohexyl) sulfide, 1,4-diisocyanatobenzene, 2,4-diisocyanatotoluene, 2,6-diisocyanatotoluene and mixtures thereof, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenyl-methylene diisocyanate, 2,4'-diphenylmethylene diisocyanate, modified diphenylmethylene diisocyanaes modified with carbodiimides to liquify same, and poly-methylene poly(phenyleneisocyanates) having the formula:

wherein x has an average value from 1.1 to 5 inclusive (preferably from 2.0 to 3.0), and mixtures thereof. A useful mixture of polyisocyanates comprises 80 weight percent 2,4-tolylenediisocyanate and 20 weight percent 2,6-tolylenediisocyanate.

The following examples are presented. The examples representing this invention are numbered. Those examples that are lettered are comparative examples which do not illustrate the invention. The following is a glossary of terms used in the examples.

| % | percent by weight unless otherwise specified |
|---|---|
| ratios | are based on weight |
| parts | parts by weight |

-continued

| | |
|---|---|
| sec. | seconds |
| in | inch or inches |
| mm | millimeters |
| cm | centimeters |
| Polyol I | Polypropylene oxide-polyethylene oxide triol made from propylene and ethylene oxides and glycerine and having a theoretical number average molecular weight of about 5000 and a hydroxyl number of about 35. The ethylene oxide units are present primarily in blocks and the end units are substantially all ethylene oxide units, i.e., the ethylene oxide is used to "cap" the triol. Based on its total weight, this triol contains about 15 percent ethylene oxide. |
| Polyol II | A polymer/polyol formed by the copolymerization of styrene-acrylonitrile in-situ in a polyol similar to Polyol I to provide about 22% of the styrene-acrylonitrile copolymer content based on total polyol weight. This polyol has a hydroxyl number of about 28. |
| Polyol III | A polymer/polyol similar to Polyol II described above with a styrene-acrylonitrile copolymer content of 8.6% and a hydroxyl number of about 25. |
| Polyol IV | A polymer/polyol similar to Polyol II described above with a styrene-acrylonitrile copolymer content of about 28% and a hydroxyl number of about 28. |
| Polyol V | A polypropylene-polyethylene oxide triol similar to Polyol I above except 16.5% of its total weight is ethylene oxide. |
| DABCO 8118 | A solution of 29 wt. % triethylene diamine, 61 wt. % dipropylene glycol and 10 wt. % dimethyl aminoethylmorpholine. |
| Catalyst I | A solution of 70% by wt. bis(2-dimethyl-aminoethyl)ether and 30% by wt. of dipropylene glycol. |
| Catalyst II | An amine catalyst-water preblend containing 69.84% water marketed by Union Carbide Corporation. |
| Stabilizer I | An organo modified polysiloxane manufactured and sold by Union Carbide Corporation. |
| Stabilizer II | An organo modified polysiloxane manufactured and sold by Union Carbide Corporation. |

EXAMPLES 1 AND A

This example sets forth a comparison of the use of heretofore known vents each having a single opening in comparison Example A versus vents of this invention each having 16 openings of a smaller individual size but additively having a cross-sectional surface area equivalent to the single opening vent.

In these comparative examples, two foam formulations were prepared from the ingredients listed in Table I. Each formulation was prepared by first mixing all of the ingredients except the TDI and the Fluorocarbon 11 blowing agent at 4000 rpm for 55 secs. The Fluorocarbon 11 was added after 45 secs. of mixing and mixing was continued for the remaining 10 sec. to make up 55 sec. of total mixing of the initial ingredients. After mixing was stopped, the TDI was added quickly and mixing was continued for 5 more secs. after which the mixture was quickly poured into a waxed aluminum mold ($15'' \times 15'' \times 5''$) provided with a lid hinged to the mold and four vent holes of the size described in Table II provided close to each corner of the lid. The lid is provided with a latch for holding it in closed position. After pouring the resultant mixture into the mold, the lid was closed and latched. The mold temperature was about 135° F. The mixture in the mold was allowed to foam and rise and it filled the mold. Some of the foam extruded through the four vent holes. In each Example 1 and A the foam was allowed to set for 2 mins. from the pour and then was placed in a 250° F. oven for about 6 mins. after which the foam was demolded. The molded foam product was tested in each case for pad weight, exudate weight and vent collapse.

It is seen from Table II that while the single opening, relatively large vent of Example A exuded 71 grams of material the vent of Example 1 exuded only 42 grams. This is a decrease of 41%. It is also shown that the collapse around the vent area is significantly decreased by the novel vents. This value is the sum of the diameters of the collapsed areas under each vent found after sectioning the foam parallel to and ½ inch below the top surface of the molded product. If converted to area according to the formula, $\pi \cdot D^2$ divided by 4 wherein D is the sum of diameters, the area of collapse caused by the single opening vent of the prior art is almost 200 times greater than the area of collapse caused by the multiple opening vents of this invention.

TABLE I

| FORMULATION | EXAMPLES 1 AND A |
|---|---|
| Polyol I | 60 |
| Polyol II | 40 |
| Diethanolamine | 1.53 |
| Water | 3.5 |
| Catalyst I | 0.15 |
| DABCO 8118 | 0.6 |
| Dibutyltin mercaptide | 0.0065 |
| Stabilizer I | 1.89 |
| Fluorocarbon 11 | 8.0 |
| Toluene Diisocyanate | 104 Index |

TABLE II

| | EXAMPLE A | EXAMPLE 1 |
|---|---|---|
| Holes/Vent, number | 1 | 16 |
| Hole Diameter, mm, | 6.24 | 1.56 |
| Hole Diameter, in. | 1/4 | 1/16 |
| Vents/Mold | 4 | 4 |
| Vent Area/Vent, mm$^2$ | 30.57 | 30.57 |
| Vent Area/Vent, in$^2$ | $4.909 \times 10^{-2}$ | $4.909 \times 10^{-2}$ |
| Mold Vent Time, sec. | 36 | 38 |
| Pad Weight, gms. | 416 | 443 |
| Vent Collapse | | |
| (total dia.), mm | 177.8 | 12.5 |
| (total dia.), in. | 7 | 0.5 |
| Exudate, gms. | 71 | 42 |

EXAMPLES 2 AND B

This example compares the use of air vents where, in Example B, a vent having a single opening of 1/16 in. (1.56 mm) diameter was used and, in Example 2, a multiple opening air vent having 4 openings of 1/32 inch (0.78 mm) each was used. A rapid demold formulation set forth in Table III was used in both Examples B and Example 2. All values in Table III are in parts by weight. The mixing procedure used is the same as that given in Example 1. The types of vents used in Examples 2 and B and the molding results are given in Table IV.

It it seem from Table IV that the amount of exudate in Example 2 is 82% less than the amount of exudate in comparison Example B. Thus, the heretofore known single opening vent wastes more than five times as much material as the novel multiple opening vents. This invention provides a considerable savings in molding material.

TABLE III

| FORMULATION | EXAMPLES 2 AND B |
|---|---|
| Polyol III | 87 |
| Polyol IV | 13 |
| Catalyst II | 6.45 |
| Stabilizer II | 1.50 |
| Toluene Diisocyanate | 100 Index |

TABLE IV

|  | EXAMPLE B | EXAMPLE 2 |
|---|---|---|
| Holes/Vent | 1 | 4 |
| Hole Diameter, mm | 1.56 | 0.78 |
| Hole Diameter, in. | 1/16 | 1/32 |
| Vents/Mold | 4 | 4 |
| Vent Area/Vent, mm$^2$ | 1.91 | 1.91 |
| Vents Area/Vent, in$^2$ | $3.07 \times 10^{-3}$ | $3.07 \times 10^{-3}$ |
| Mold Vent Time, sec. | 45 | 47 |
| Pad Weights, gms. | 474 | 486 |
| Vent Collapse (total dia.) | 0 | 0 |
| Exudate, gms. | 17 | 3 |

EXAMPLES 3 AND C

This example sets forth a comparison of the performance of a more efficient self-cleaning vent with a standard vent. In this example the heretofore known vent of comparison Example C has one opening of ⅛ inch (3.12 mm) diameter. The depth of this opening is more than ⅛ inch. In Example 3 there are 16 holes with each 1/32 inch (0.78 mm) in diameter and 0.005 inch deep. Table V sets forth a commercial automotive seat back polyurethane formulation in parts by weight was used in Examples 3 and C. The formulation mixing procedure that was used was the same as that described in Example 1. The types of vents used in Examples 3 and C and the molding results are given in Table VI.

It is noted in Table VI that the amount of exudate in Example 3 is 84% less than the amount of exudate in comparison Example C. It is also to be noted that the additive vent collapse diameter in Example 3 is 0 while the additive vent collapse diameter for Example C is 4 inches. Thus, the vents of this invention provide substantial savings in materials consumed and provide a better product. The heretofore known single opening vents wasted more than six times the material lost by the use of the novel multiple opening vents. In addition, the openings of the vents used in Example 3 remained clean and clear of polyurethane.

TABLE V

| FORMULATION | EXAMPLES 3 AND C |
|---|---|
| Polyol V | 60 |
| Polyol II | 40 |
| Diethanolamine | 1.53 |
| Water | 3.50 |
| Catalyst I | 0.15 |
| DABCO 8118 | 0.60 |
| Stabilizer I | 1.8 |
| Fluorocarbon 11 | 8.0 |
| Toluene Diisocyanate | 104 Index |

TABLE VI

|  | EXAMPLE C | EXAMPLE 3 |
|---|---|---|
| Holes/Vent | 1 | 16 |
| Hole Diameter, mm | 3.12 | 0.78 |
| Hole Diameter, in. | 1/8 | 1/32 |
| Vents/Mold | 4 | 4 |
| Vent Area/Vent, mm$^2$ | 7.64 | 7.64 |
| Vent Area/Vent, in$^2$ | $1.227 \times 10^{-2}$ | $1.227 \times 10^{-2}$ |
| Mold Vent Time, sec. | 37 | 44 |
| Pad Weight, gms. | 439 | 430 |
| Vent Collapse, mm | 101.6 | 0 |
| Vent Collapse, in. | 4 | 0 |
| Exudate, gms. | 45 | 7 |

EXAMPLES 4 AND D

In these examples the commercial seat back formulation set forth in Examples 3 and C was prepared and molded in an Admiral low pressure/high shear foam molding machine having a cylindrical high-shear mixing head having a through-put of 100 lbs. per minute. The machine has provisions for three streams and utilized a stream temperature of 75° F. and a mixer speed of 6000 rpm.

A full scale automotive back mold having a hinged lid was used in these examples. The mold in the heretofore known mode of operation (i.e. Example D) was equipped with 6 vents each having a single opening having a diameter of 1/16 inch and 15 vents each having a single opening having a diameter of ⅛ inch. The mold in the mode of operation utilizing the present invention, i.e., Example 4, the six 1/16 inch single opening vents were replaced with 6 multiple opening vents, each having 4 openings of 1/32 inch diameter each, and the fifteen ⅛ inch vents were replaced with 15 multiple opening vents each having 16 openings of 1/32 inch each. Each of the multiple openings in Example 4 was 0.005 inch deep. The vent area of each 1/16 inch diameter single opening vent was 0.003 in.$^2$ which was the same as that of each of the six 1/32 in. four opening vents. The vent area of each ⅛ inch diameter single opening vent was 0.012 in.$^2$ which was the same as that of each of the fifteen 1/32 inch sixteen opening vents.

Prior to charging the mold with the foaming formulation, a release agent was applied to the mold at a temperature of about 155° to 160° F. In each case all of the ingredients except the Fluorocarbon 11 blowing agent and TDI were preblended and three separate streams, one containing the preblend, another containing the Fluorocarbon 11 blowing agent and the third containing the TDI were mixed in the machine and the resulting mixture poured into the mold. When the minimum-fill amount had been added, the mold was closed and latched and put into an oven where it was maintained at 160° to 165° F. for 6.75 mins. Other operational parameters are provided in Table VII which also provides the pad weight and exudate weight for each of the products of Examples 4 and D. Table VII shows that the amount of exudate is 96% less (428 grams as opposed to 15) when the multi-opening vents of this invention are used in place of the single opening vents. This represents a considerable savings in molding material which by heretofore known methods would be lost as waste. Stated another way, the loss of exudate waste through the single opening vent was more than twenty-eight times that of the novel multiple opening vents.

TABLE VII

|  | EXAMPLE D | EXAMPLE 4 |
|---|---|---|
| Holes/Vent | 1 | Multiple |
| Vents/Mold | 21 | 21 |
| Hole Dia., mm | 6(1.56) + 15(3.12) | 6(0.78 × 4) + 15(0.78 × 16) |

TABLE VII-continued

| | EXAMPLE D | EXAMPLE 4 |
|---|---|---|
| Hole Dia., in. | 6(1/16) + 15(1/8) | 6(1/32 × 4)+ 15(1/32 × 16) |
| Vent Area/Mold, mm$^2$ | 92.71 | 92.71 |
| Vent Area/Mold, in$^2$ | $2.0248 \times 10^{-1}$ | $2.0248 \times 10^{-1}$ |
| Mold Vent Time, sec. | 31 | 46 |
| Machine Through Put gms./sec. | 540 | 540 |
| Pour Time, sec. | 5.4 | 4.5 |
| Pad Weight, gms. | 1924 | 1917 |
| Exudate, gms. | 428 | 15 |

What is claimed is:

1. In a mold for molding a foaming mixture of polyurethane to produce a molded polyurethane article, said mold having a mold cavity and internal intricacies defining the shape of said article and a plurality of reusable vents, the improvement comprising each of said vents being provided with a plurality of clustered small self-cleaning openings which have a commutative cross-sectional area sufficiently large to provide the desired direction and rate of flow of said foaming mixture in said mold cavity to fill the intricacies of said mold, wherein each of said openings having a cross-sectional area sufficiently small to prevent exudation of substantial amounts of foaming mixture therethrough, thereby reducing the amount of said mixture passing through said vents and reducing the amount of foam collapse in those portions of said article adjacent said vents and wherein in each of said openings the ratio of the depth of said openings to the diameter of said openings is 1 or less therby enhancing the self-cleaning ability of said openings.

2. Mold as in claim 1 wherein each of the plurality of small openings of said vent have the same cross-sectional area.

3. Mold as in claim 1 wherein the plurality of small openings of said vent have different cross-sectional areas.

4. Mold as claimed in claim 1 wherein said small openings are circular and have a diameter of not greater than about 1/16 inch.

5. Mold as claimed in claim 1 wherein said small openings are circular and have a diameter of not greater than ⅛ inch.

* * * * *